United States Patent
Kuroki

(10) Patent No.: US 10,838,405 B2
(45) Date of Patent: Nov. 17, 2020

(54) NUMERICAL CONTROLLER

(71) Applicant: FANUC CORPORATION, Yamanashi (JP)

(72) Inventor: Hideki Kuroki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 276 days.

(21) Appl. No.: 15/981,214

(22) Filed: May 16, 2018

(65) Prior Publication Data

US 2018/0341250 A1   Nov. 29, 2018

(30) Foreign Application Priority Data

May 24, 2017   (JP) ................................. 2017-102729

(51) Int. Cl.
  *G05B 11/01*      (2006.01)
  *G05B 19/41*      (2006.01)

(52) U.S. Cl.
  CPC .... *G05B 19/41* (2013.01); *G05B 2219/34396* (2013.01)

(58) Field of Classification Search
  CPC ................ G05B 19/41; G05B 2219/34396
  See application file for complete search history.

(56) References Cited

U.S. PATENT DOCUMENTS

| | | | | |
|---|---|---|---|---|
| 2006/0095832 | A1* | 5/2006 | Serra | G06F 40/18 715/209 |
| 2009/0252163 | A1* | 10/2009 | Biswas | H04L 12/1836 370/390 |
| 2011/0137434 | A1 | 6/2011 | Chang et al. | |
| 2018/0314734 | A1* | 11/2018 | James | G06F 16/24542 |

FOREIGN PATENT DOCUMENTS

| | | |
|---|---|---|
| CN | 101576933 A | 11/2009 |
| JP | 6142006 A | 2/1986 |
| JP | H05204421 A | 8/1993 |
| JP | H11095825 A | 4/1999 |
| JP | 2000293215 A | 10/2000 |
| JP | 2009-003972 A | 1/2009 |
| WO | 2016157395 A1 | 10/2016 |

OTHER PUBLICATIONS

Notification of Reasons for Refusal for Japanese Application No. 2017-102729, dated Feb. 5, 2019, with translation, 9 pages.
Chinese Office Action for Chinese Application No. 201810497581. 2, dated Mar. 11, 2020, with translation, 14 pages.

* cited by examiner

*Primary Examiner* — Zhipeng Wang
(74) *Attorney, Agent, or Firm* — RatnerPrestia

(57) ABSTRACT

A numerical controller that is capable of independently controlling multiple control groups can cause a machine to simultaneously execute multiple operations. The numerical controller includes a program analysis unit that analyzes a program and distinguishes the commands for the multiple control groups from each other, and a program execution unit that executes the commands for the multiple control groups independently on a per-control-group basis.

5 Claims, 4 Drawing Sheets

NUMERICAL CONTROLLER

CROSS-REFERENCE TO RELATED APPLICATION

This application is a new U.S. Patent Application that claims benefit of Japanese Patent Application No. 2017-102729, filed May 24, 2017, the disclosure of this application is being incorporated herein by reference in its entirety for all purposes.

BACKGROUND OF THE INVENTION

Field of the Invention

The present invention relates to a numerical controller and in particular to a numerical controller that is capable of independently controlling multiple control groups.

Description of the Related Art

When a conventional numerical controller needs to simultaneously control two or more sets of mechanical actions, axes are controlled by a multi-path system having multiple machining paths and loader paths according to applications. A multi-path system as used herein refers to a system having a plurality of paths for which independent axis control can be implemented. It is necessary to create machining programs (NC programs) for the individual paths in a multi-path system.

Also, when movements of axes should take place in a coordinated manner among the paths in a multi-path system, in other words, when the axis controls should be coordinated, it is necessary to use a wait command and synchronize the execution timings of the programs or blocks among the paths.

In addition, when it is desired to allow a particular axis to be used via multiple paths in a multi-path system, it is necessary to use an arbitrary axis switching function. The arbitrary axis switching function is a special function enabling a program of one path to control an axis belonging to another path in a multi-path system. For example, in the case where a path 1 has axes X1, Y1, and Z1 and a path 2 has axes X2, Y2, and Z2, the arbitrary axis switching function allows the path 1 to control the axis X2.

Here, as a related prior-art technique, reference may be made to Japanese Patent Laid-Open No. 2009-003972. Japanese Patent Laid-Open No. 2009-003972 describes a numerical controller having a function of editing programs of multiple paths. Since the numerical controller disclosed therein displays the programs of individual paths in parallel with each other on the same screen, it is possible to relatively easily recognize the synchronization relationship among the paths.

Although Japanese Patent Laid-Open No. 2009-003972 facilitates handling of a conventional multi-path system, it does not solve various problems as such associated with the conventional multi-path system. Specifically, in a conventional multi-path system, machining programs are required on a per-path basis. As a result, an axis control command is distributed among multiple program files, making it difficult to grasp the relative movements and the positional relationship of the axes belonging to the individual paths, which is an example of the above-mentioned various problems. Also, management of the program files becomes complicated, causing the program memory to be heavily used, which is another example of the above-mentioned various problems.

In addition, conventional multi-path systems need to use a wait command so as to make the axis movements take place in a coordinated manner among their paths. As a result, the command may become complicated, causing a program mistake, and the time required for debugging may be prolonged. Further, still another problem is that the cycle time is extended due to increase in the number of the commands, and the time during which no cutting is performed is extended as well due to waiting.

In this regard, although adopting a single-path system can simplify the programming, different mechanical actions cannot be simultaneously performed. While it is possible to operate multiple axes in parallel based on PMC axis control and peripheral axis control, the PMC axis control usually involves the problem that an end user cannot change the operations and the like, which constrains flexibility of commands. The peripheral axis control on the other hand has flexibility of commands but involves another problem that coordinated movements of axes is restricted because the number of target axes to which commands can be directed is restricted as well.

SUMMARY OF THE INVENTION

An object of the present invention, which has been made for solving the above-described and other problems, is to provide a numerical controller that is capable of independently controlling multiple control groups. A numerical controller according to an embodiment of the present invention is a numerical controller capable of causing a machine to simultaneously execute multiple operations, the device including a program analysis unit configured to analyze a program and distinguish commands for multiple control groups, and a program execution unit configured to independently execute the commands for the multiple control groups on a per-control-group basis.

In the numerical controller according to an embodiment of the present invention, the program may describe the commands for the multiple control groups in one block such that the commands are distinguished from each other by a control group delimiter character.

In the numerical controller according to an embodiment of the present invention, the program may describe the commands for the multiple control groups in multiple blocks such that the commands are associated with each other by a continuation delimiter character.

In the numerical controller according to an embodiment of the present invention, the program execution unit may be configured to simultaneously execute the commands for the multiple control groups.

In the numerical controller according to an embodiment of the present invention, the program may describe a wait delimiter character such that the wait delimiter character is associated with the commands for the multiple control groups.

In the numerical controller according to an embodiment of the present invention, the control group may be a path.

In the numerical controller according to an embodiment of the present invention, the control group may be an interpolation group.

According to the present invention, it is made possible to provide a numerical controller that is capable of independently controlling multiple control groups.

BRIEF DESCRIPTION OF THE DRAWINGS

The foregoing and other objects and features of the present invention will become apparent from the following description of examples with reference to the accompanying drawings, in which.

DETAILED DESCRIPTION OF THE PREFERRED EMBODIMENTS

Figure 1:
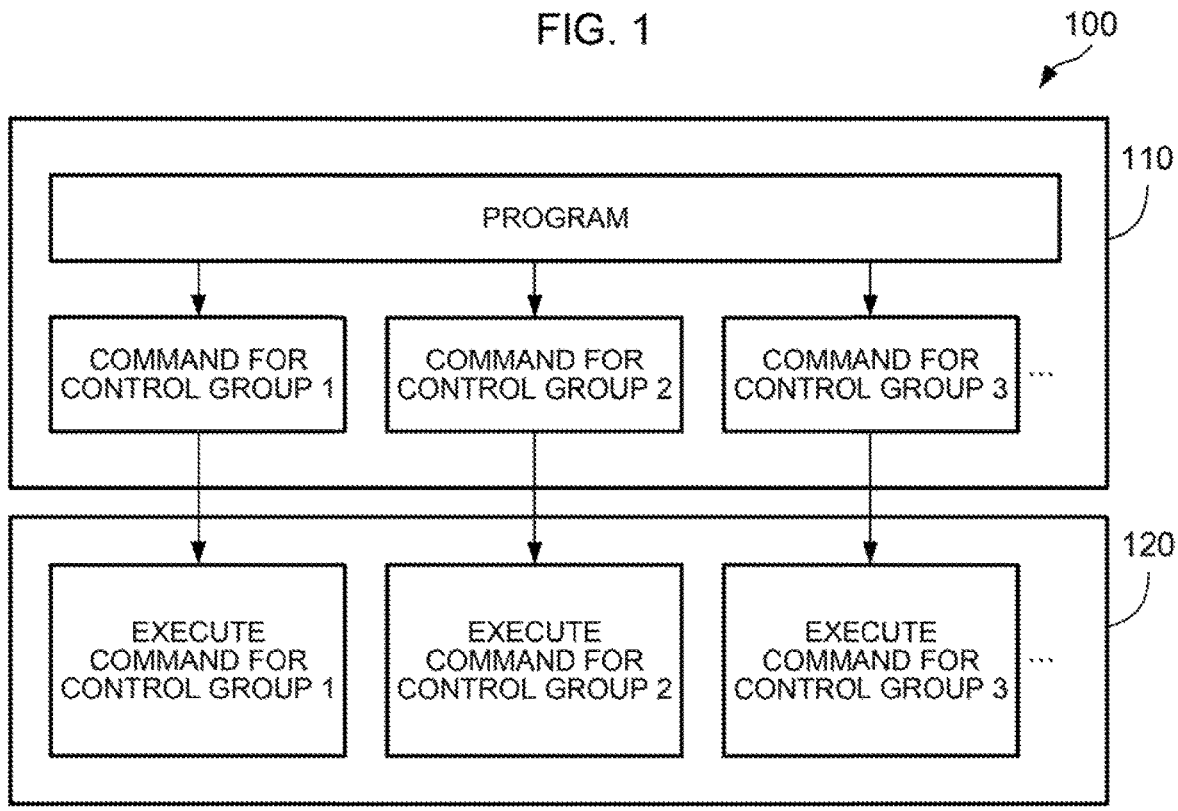
FIG. 1 is a block diagram illustrating features of a numerical controller according to an embodiment of the present invention.

Embodiments of the present invention will be described hereinbelow with reference to the drawings. First, the features of a numerical controller 100 according to an embodiment of the present invention are described using the block diagram of FIG. 1. The numerical controller 100 includes a program analysis unit 110 and a program execution unit 120.

The program analysis unit 110 is configured to analyze a program that has been input, where the program to be input includes commands for a plurality of control groups for which axes can be controlled independently.

The program execution unit 120 is configured to independently control axial movements for the multiple control groups in accordance with the commands described in the above-mentioned program on a per-control-group basis.

The control group is explained below. A control group as used herein refers to a unit for performing independent axis controls. For example, a control group may be a conventional path, in which case programs for controlling the multiple paths according to this embodiment will be described together in one single program file. Alternatively, the control group may refer to each of a plurality of interpolation groups which are included in one of the paths constituting a multi-path system. An interpolation group as used herein refers to a unit for execution of a program by which an interpolation process can be executed without being influenced by other interpolation groups. Since the interpolation groups are executed independently of each other, axes belonging to different interpolation groups can be controlled and operated in parallel with each other.

Figure 2:
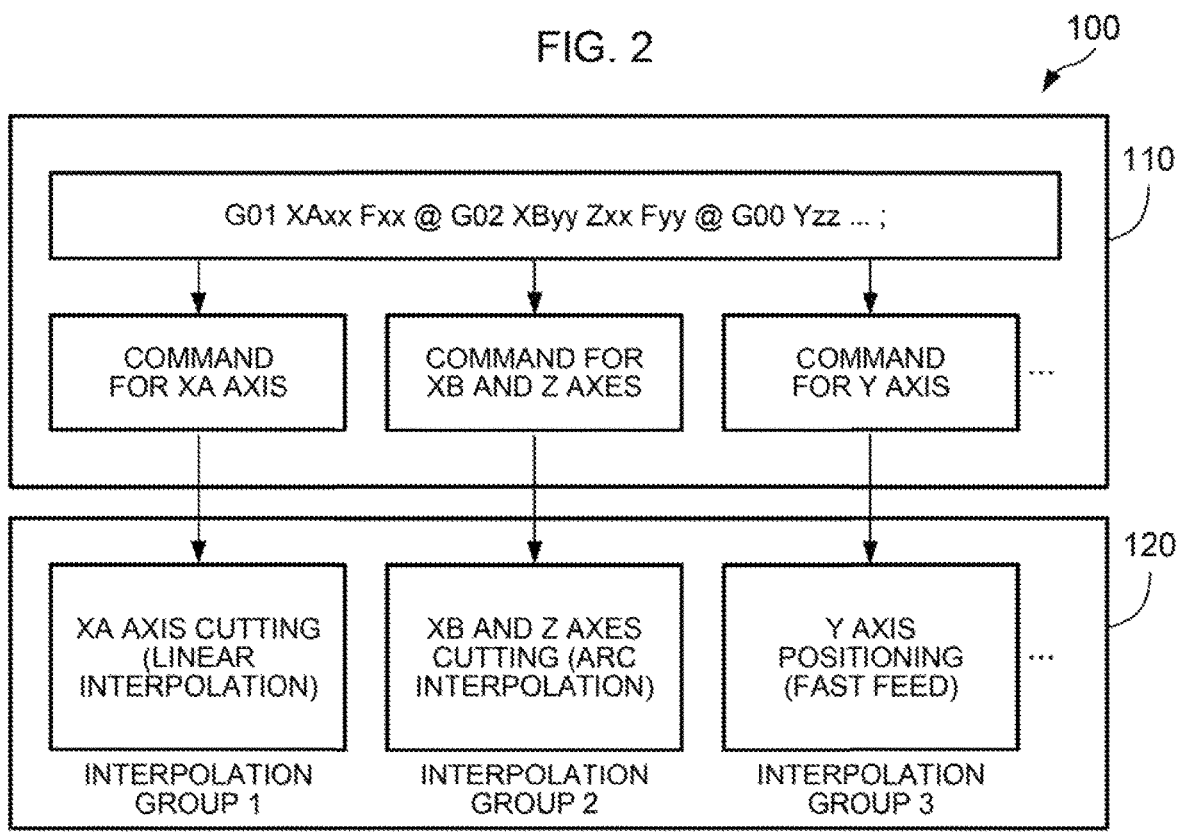
FIG. 2 is a block diagram illustrating features of a numerical controller according to an embodiment of the present invention.

FIG. 2 is a block diagram that illustrates an example where the program execution unit 120 controls multiple interpolation groups independently. In this example, an interpolation group 1 executes cutting along an XA axis (linear interpolation), an interpolation group 2 executes cutting along two axes, i.e., XB and Z axes (arc interpolation), and an interpolation group 3 executes fast-forward along a Y axis. The interpolation groups 1 to 3 are basically to be executed in parallel with each other.

The program that is input to the program analysis unit 110 is explained below. The program in accordance with this embodiment distinguishes three types of special characters, i.e., a control group delimiter character, a continuation character, and a wait delimiter character.

The control group delimiter character is used to describe commands for multiple control groups by one block. For example, in the command (1) described below, commands for three control groups are delimited by the control group delimiter characters "@" and described by one block. The commands for three control groups are: the command "G01 XAxx Fxx" for the control group 1; the command "G02 XByy Zxx Fy" for the control group 2; and the command "G00 Yzz . . . " for the control group 3.

G01 XAxx Fxx @ G02 XByy Zxx Fyy @
  G00 Yzz . . . ;    Command (1)

The continuation character is used in describing commands associated with multiple control groups with multiple blocks. For example, in the command (2) described below, commands for three control groups terminating with the same continuation character "@1" are described across multiple blocks. The commands for three control groups specifically are: the command "G01 XAxx Fxx" for the control group 1; the command "G02 XByy Zxx Fy" for the control group 2; and the command "G00 Yzz . . . " for the control group 3.

G01 XAxx Fxx @1;

G02 XByy Zxx Fyy @1;

G00 Yzz . . . @1;    Command (2)

If the control group delimiter character and the continuation character are included in the program, the program analysis unit 110 divides the command into pieces of command for multiple control groups based on the above-described rules. The program execution unit 120 then executes the commands associated with the corresponding control groups in parallel with each other on a per-control-group basis. It may be noted here that when the commands associated with multiple control groups coupled by the above-described control group delimiter character(s) or continuation delimiter character(s) are to be executed, the program execution unit 120 simultaneously executes these commands. Specifically, the command "G01 XAxx Fxx" for the control group 1, the command "G02 XByy Zxx Fy" for the control group 2, and the command "G00 Yzz . . . " for the control group 3, which are defined in the command (1) or the command (2), start to be executed simultaneously by the program execution unit 120.

The wait delimiter character is used to define whether or not to wait for completion of processing after having executed simultaneously the above-described commands associated with the multiple control groups coupled by the control group delimiter character(s) or the continuation delimiter character(s). For example, in the command (3) described below, the wait delimiter character "¥" is described in the block (at the end of the block in this example).

G01 XAxx Fxx @ G02 XByy Zxx Fyy @
  G00 Yzz . . . ¥;    Command (3)

If the wait delimiter character is described, the program execution unit 120 executes the next commands associated with the corresponding control groups without waiting for completion of the above-described commands associated with the multiple control groups coupled by the control group delimiter character or the continuation delimiter character. Specifically, in the case of the command (3), for example, when the command "G01 XAxx Fxx" for the control group 1 is completed first, transition is made to the execution of the next command for the control group 1 without waiting for completion of the command "G02 XByy Zxx Fy" for the control group 2 and the command "G00 Yzz . . . " for the control group 3.

Meanwhile, if the wait delimiter character is not described, the program execution unit 120 waits for completion of the commands associated with the multiple control groups coupled by the control group delimiter character(s)

or the continuation delimiter character(s). Specifically, by way of example, in the case of the command (1) in which the wait delimiter character is not described, if, for example, the command "G01 XAxx Fxx" for the control group 1 is completed first and the command "G02 XByy Zxx Fy" for the control group 2 is subsequently terminated, then the program execution unit 120 waits for completion of the remaining command "G00 Yzz . . . " for the control group 3 without making transition to the next commands for the control groups 1 and 2. When execution is completed for all of the control groups, the program execution unit 120 executes the next commands for the corresponding control groups, respectively.

It should be noted that the above-described control group delimiter character "@," the continuation delimiter character "@1," and the wait delimiter character "¥" are merely exemplary ones and other appropriate characters can be used therefor. In addition, in contrast to the above-described example, another configuration may also be adopted in which, completion of execution of the commands of the individual control groups may be waited for if the wait delimiter character is described, and otherwise may not be waited for. Further, although the continuation delimiter character and the wait delimiter character are described at the end of the block in the above-described example, they may be adapted to be described at other locations. Also, although in the above-described example, the wait delimiter character "¥" is valid for all of the control groups, whether or not it is valid may be specified for each control group.

According to the present embodiment, the axis commands belonging to all the control groups can be aggregated into one single program. For example, it is made possible to describe the axis commands belonging to multiple paths such that they are aggregated into the program of one path. In this case, the programs may be created in a conventional manner for the respective paths to execute the axis commands. Specifically, the present scheme can be implemented in combination with a conventional scheme, by virtue of which it is made possible to implement programming readily understood with the overview of the entire machine (for example, all the paths) taken into account.

Also, according to the present embodiment, it is made possible to describe multiple commands in one block.

As a result, it is not necessary to wait using a wait command for each path as in the conventional systems. In other words, whilst the path has been the unit of waiting in the conventional systems, waiting can be performed on a per-command basis according to the present embodiment. By virtue of this, it is made possible to implement more finely tuned control on the simultaneous execution of different mechanical actions and shorten the cycle time.

In addition, according to the present embodiment, any appropriate axis can be controlled by the command within any appropriate control group. By virtue of this, the conventional arbitrary axis switching function does not need to be provided.

EXAMPLE 1

Figure 3:
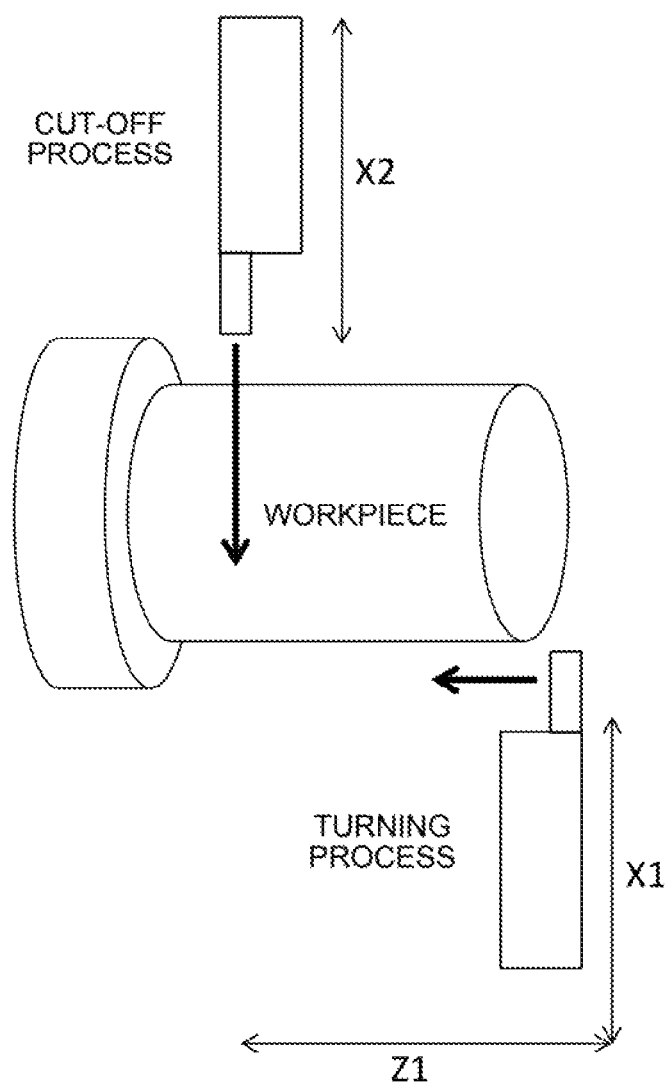
FIG. 3 is a diagram illustrating a mechanical action according to Example 1.

Example 1 will be described using FIG. 3. Example 1 is an example where a cut-off process and a turning process are to be started simultaneously using the numerical controller 100 in accordance with the present embodiment. In this case, the turning process is completed faster than the former process, and subsequently the cut-off process will be completed. In this manner, a processing flow is achieved in which a workpiece that has been subjected to the turning process is to be cut off by the cut-off process.

In order to perform such a machining process on a conventional multi-path system, it has been necessary to create the programs Path1 and Path2 for two paths.

. . .

Mxx P12;

G01 Z1xx Fxx;                                                Path1

. . .

Mxx P12;

G01 X2xx Fxx;                                                Path2

Here, "Mxx P12;" is a wait command. The path Path1 and the path Path2 wait until the respective paths reach this wait command and then execute the turning process (command "G01 Z1xx Fxx;" of the Path1) and the cut-off process (command "G01 X2xx Fxx;" of the Path2) independently on a per-path basis. In this example, since waiting is performed on a per-path basis, a wait time occurs as a matter of course on a path that has reached the wait command earlier than the other paths and, during the wait time, a state is entered where other commands cannot be executed.

In addition, when performing such a machining process on a conventional single-path system, the following or other program is created. According to this program, after the turning process has been completed, the cut-off process is started.

G01 Z1xx Fxx;

G01 X2xx Fxx;

Alternatively, in a single path system, the following or other program may be used. According to this program, the machining will be executed depending on the F command of the lower axis.

G01 Z1xx X2xx Fxx;

Meanwhile, in Example 1, the following program is used. According to the present embodiment, by using such a command, a plurality of operations can be started on a per-command basis. By virtue of this, it is made possible to shorten the unnecessary wait time which has been hitherto needed in conventional multi-path systems.

G01 Z1xx Fxx @ G01 X2xx Fxx;

EXAMPLE 2

Figure 4:
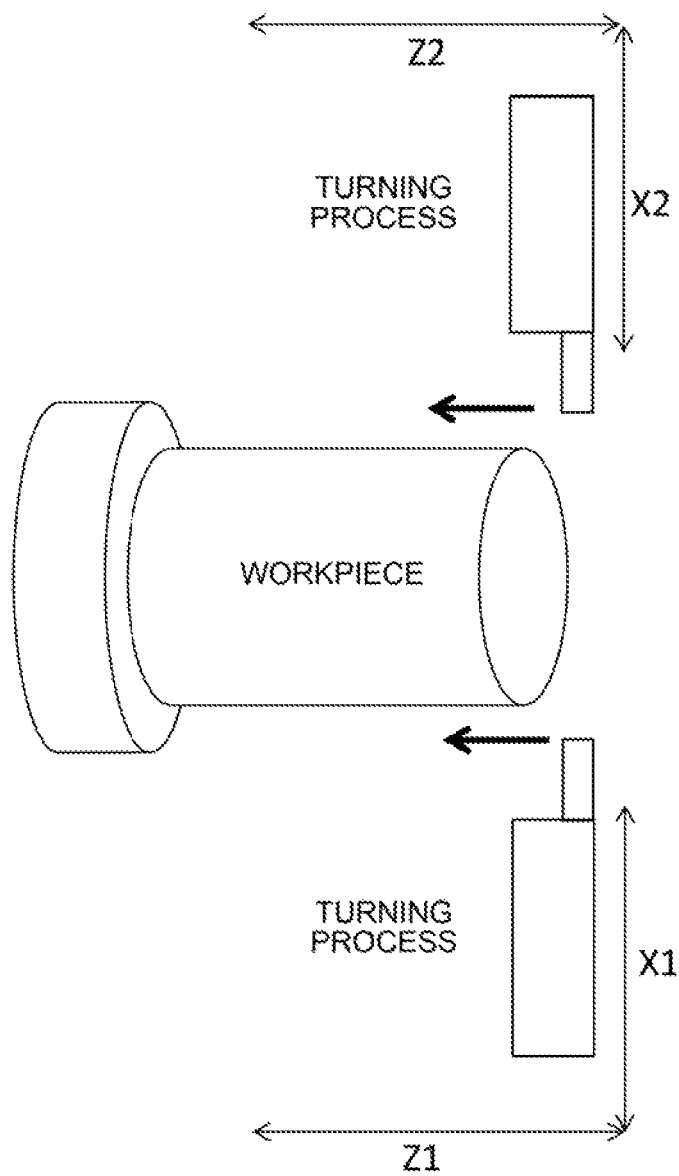
FIG. 4 is a diagram illustrating a mechanical action according to Example 2.

Example 2 will be described using FIG. 4. Example 2 is an example where balanced cutting, i.e., a process of simultaneous turning by multiple tools is implemented.

In order to perform such a machining process on a conventional multi-path system, it is necessary to create the following programs Path1 and Path2 for two paths.

G68 P12;

G01 Z1xx Fxx;                                                Path1

G68 P12;

G01 Z2xx Fxx;                                                Path2

Here, "G68 P12;" is a wait command. The path Path1 and the path Path2 wait until each path reaches the wait command and then execute the turning process (command "G01 Z1xx Fxx;" of the Path1) and the cut-off process (command "G01 Z2xx Fxx;" of the Path2) independently on a per-path basis.

Meanwhile, Example 2 uses the following program. The command as such can be executed in a conventional multipath system. However, in a conventional multi-path system, it has been necessary to provide two paths to execute this command. In contrast, according to the present embodiment, it is made possible to execute this command by one single lime. Specifically, the Z1 axis and the Z2 axis can be used by one path. As a result, the balanced cutting can be replaced by the linear interpolation of the Z1 axis and the Z2 axis.

G01 Z1xx Z2xx Fxx;

EXAMPLE 3

Figure 5:
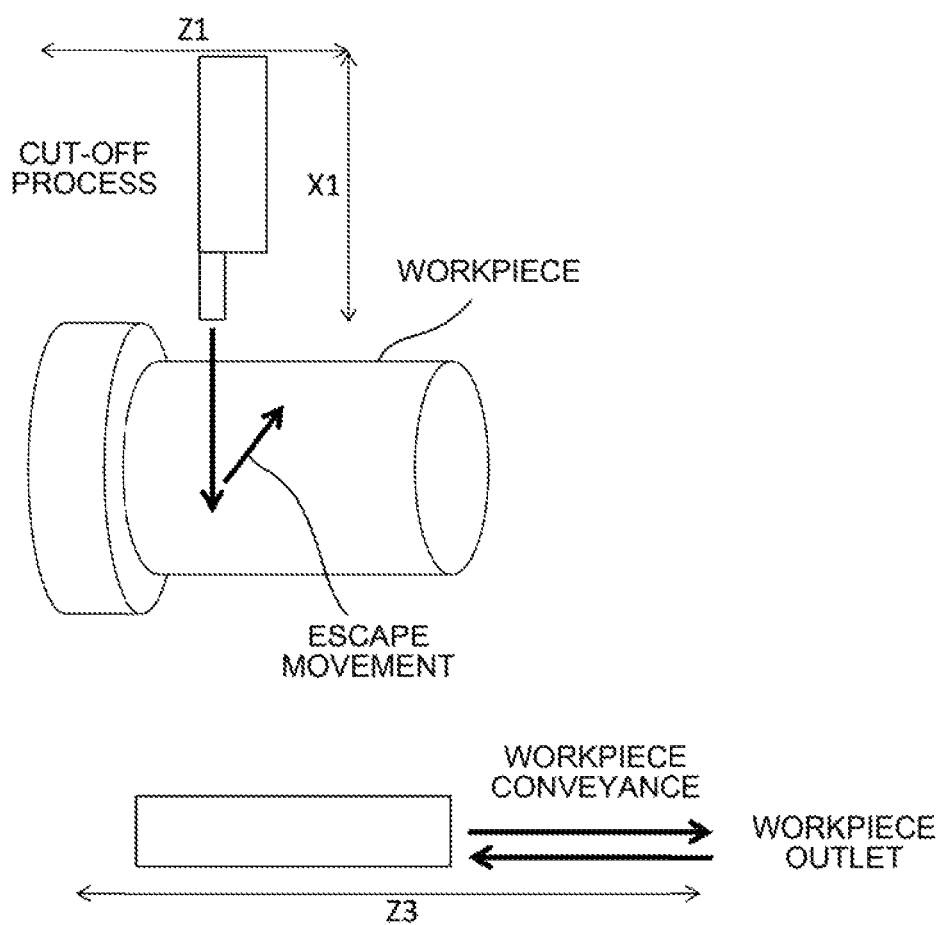
FIG. 5 is a diagram illustrating a mechanical action according to Example 3.

Example 3 will be described using FIG. 5. Example 3 is an example where an escape operation for a tool and an operation for conveying the workpiece that has been subjected to the machining are to be executed in a temporally overlapping manner. Example 3 uses the following program to implement this operation.

G01 X1xx Fxx;

G00 X1xx Z1xx @ G00 Z3xx ¥;

. . .

. . .

G00 Z3xx;

The wait delimiter character "¥" is described in the second path of the program. Here, the program execution unit 120 simultaneously executes "G00 X1xx Z1xx" (escape operation) and "G00 Z3xx" (workpiece conveyance) associated with two control groups and thereafter proceeds to the execution of the next commands of the respective control groups without waiting for the completion of the respective processes.

The command "G00 Z3xx" described in the fifth path of the program is a command for the same axis as that of the command "G00 Z3xx" described in the second path. In this manner, between the command for the same axis, the program execution unit 120 as in the conventional systems waits for completion of the previous command and then starts the execution of the next command. In this example, if the workpiece conveyance operation that was started earlier has been completed, then the following workpiece conveyance operation will be started. Completion of the previous command can be made by determining whether or not the axis is being moved on the basis of the feedback from the respective axes prior to executing the following command. Alternatively, the determination may be made by storing the position of the axis at the time of start of the execution of the previous command and according to whether or not the axis resides at this position.

As described above, the numerical controller 100 according to the present embodiment includes the program analysis unit 110 that analyzes the program and breaks it down into commands for multiple control groups and the program execution unit 120 that executes the commands associated with the multiple control groups independently of each other, i.e., in parallel with each other. By virtue of this feature, it is made possible to achieve multiple independent operations by one single program.

In addition, according to the present embodiment, it is made possible to start multiple operations simultaneously on a per-command basis and wait (or not wait) for completion of multiple operations on a per-command basis. As a result, the cycle time can be considerably shortened when compared with conventional multi-path systems. Further, since it is made possible to control in a fine-tuned manner the simultaneous execution of multiple functions, it is also made possible to implement coordinated operations which conventional multi-path systems have not hitherto been able to implement.

Here, a hardware configuration of the numerical controller 100 is described. The configuration of the numerical controller 100 having the multiple paths control function includes a memory unit such as ROM, RAM, non-volatile RAM, etc.; a display unit; a data input unit such as a keyboard, and first to n-th paths axis control unit configured to control motors that drive the movable axes of the individual paths, which are connected to a processor via a bus.

Whilst an embodiment of the present invention has been described in the foregoing, the present invention is not limited to the examples of the above-described embodiment and can be implemented in other forms with modifications made as appropriate.

The invention claimed is:

1. A numerical controller capable of causing a machine to simultaneously execute multiple operations, the controller comprising:
    a processor configured to:
    analyze a program and distinguish commands for multiple control groups that are described in one block and distinguished from each other by delimiter characters; and
    independently execute the commands for the multiple control groups in parallel on a per-control-group basis, wherein the delimiter characters include at least a control group delimiter character and a wait delimiter character.

2. The numerical controller according to claim 1, wherein the processor is configured to simultaneously execute the commands for the multiple control groups.

3. A numerical controller capable of causing a machine to simultaneously execute multiple operations, the controller comprising:
    a processor configured to:
    analyze a program and distinguish commands for multiple control groups that are described in one block and distinguished from each other by delimiter characters; and
    independently execute the commands for the multiple control groups on a per-control-group basis, wherein the delimiter characters include at least a control group delimiter character and a wait delimiter character, wherein the processor is configured to switch controls for a wait for the completion of execution of the commands for the multiple control groups in accordance with the presence or absence of the wait delimiter character.

4. The numerical controller according to claim 1, wherein the control group is a path.

5. The numerical controller according to claim 1, wherein the control group is an interpolation group.

* * * * *